March 29, 1949.　　　F. H. JOHNSON　　　2,465,456
WELDING MECHANISM
Filed Feb. 27, 1946
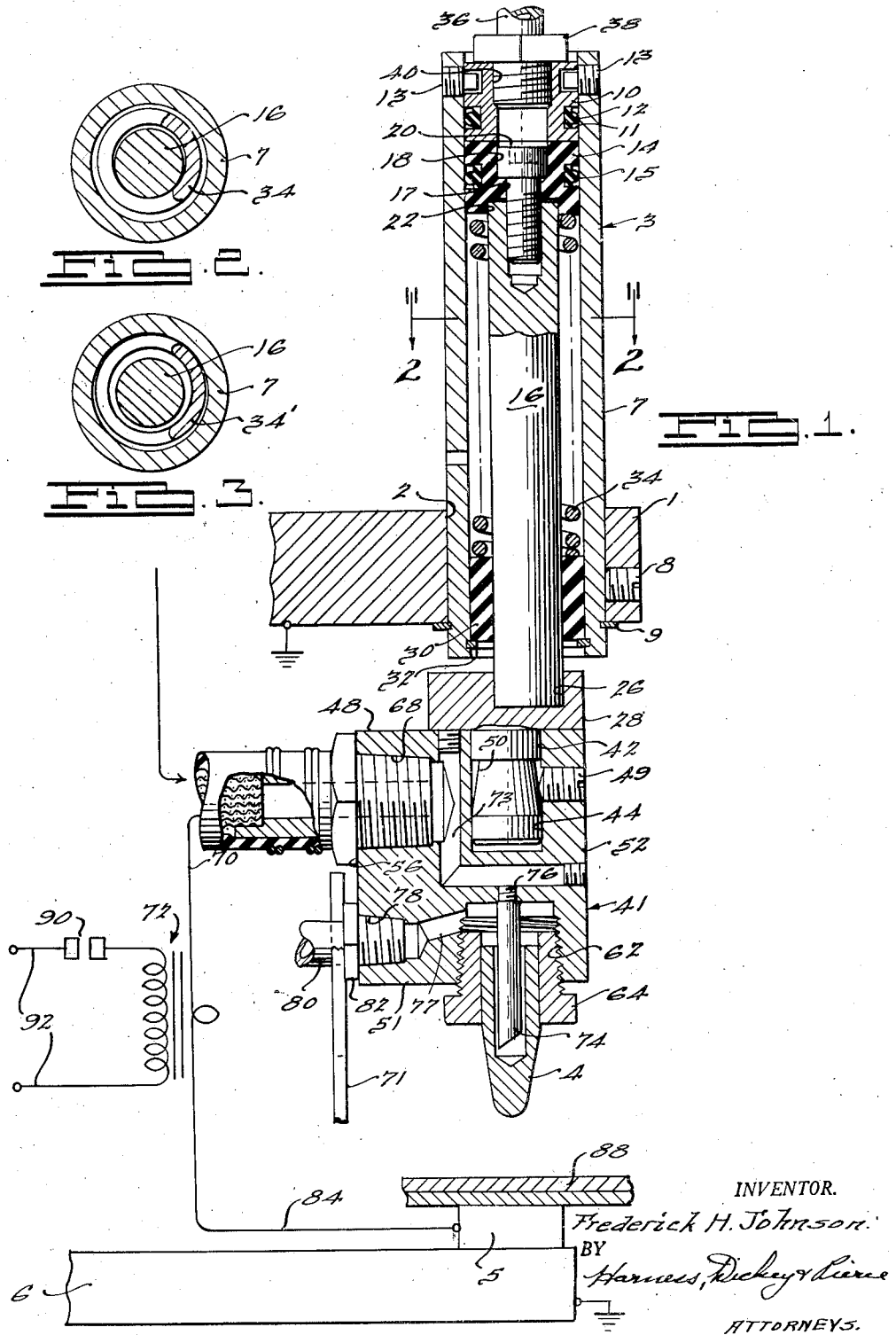
INVENTOR.
Frederick H. Johnson
BY
Harness, Dickey & Pierce
ATTORNEYS.

Patented Mar. 29, 1949

2,465,456

UNITED STATES PATENT OFFICE 2,465,456

WELDING MECHANISM

Frederick H. Johnson, Pleasant Ridge, Mich.

Application February 27, 1946, Serial No. 650,632

2 Claims. (Cl. 219—4)

This invention relates generally to a welding mechanism and more specifically to a movable head construction for carrying the movable welding electrode.

One of the primary objects of the present invention is to provide an improved mechanism for carrying the movable welding electrode which will not short the welding circuit due to the depositing of flash metal as a result of the welding operations.

Another object of the invention is to provide in such a mechanism a structure whereby the insulating members are protected as far as possible from the path of any flash metal which may escape during the welding operation.

Another object of the invention is to provide in such a mechanism structure whereby the relative positions of the electrodes may be adjusted.

Other objects of the invention will become apparent from the following specification, the drawings relating thereto, and the claims hereinafter set forth.

In the drawings, in which like numerals are used to designate like parts in the several views throughout, Fig. 1 is a partly schematic view of a welding mechanism showing in longitudinal cross section a welder head embodying the present invention;

Fig. 2 is a view taken along the line 2—2 of Fig. 1;

Fig. 3 is a view similar to that of Fig. 2, showing a modified construction.

Referring to the drawings, 1 indicates a platelike, stationary supporting member which is rigid with the body of the welding machine. An aperture 2 extending through member 1 is adapted to receive the movable welding head generally designated 3 which carries a welding electrode 4 co-operable with stationary electrode 5 supported on another portion 6 of the welding machine body. This movable welding head 3 comprises a hollow, cylindrical member 7 which extends through and substantially fits within the aperture 2 and is held in fixed relation with the plate 1 by a set screw 8 and a split ring 9. The ring 9 is received within a circumferential recess in the member 7 with one face abutting the lower surface of the member 1 to hold the member 7 against upward movement. The upward end of the member 7 away from the member 1 is sealed by an annular plug 10 which has adjacent its lower edge portion an outwardly opening circumferential recess 11 which receives a resilient, annular packing or gasket member 12 engaging the inner surface of the member 7 to prevent fluid flow between the adjacent portions of member 7 and plug 10. Adjacent the upper surface of the plug 10 are one or more outwardly opening radially extending apertures which align with apertures extending through the member 7. Set screws 13 are threaded within the aligned apertures in member 7 and extend into the registering apertures in the plug 10 whereby the plug 10 seals the open upward end of member 7. A piston member 14 is positioned within the member 7 below the plug 10 and has a circumferential annular groove in its outer periphery for receiving an annular packing or gasket member 15 for preventing fluid flow between the members 7 and 14. The piston member 14 carries a cylindrical thrust member 16 which in turn carries the electrode 4. A central aperture 17 therethrough has a counterbored portion 18 at its upper end for receiving the slotted head of a cap screw 20 which is screwthreaded into the member 16. A counterbored portion 22 adjacent the lower end of the aperture 17 locates the upper end of the thrust member 16. The thrust member 16 is guided for reciprocating movement adjacent the lower end of member 7 within an annular member 30 held within the tubular member 4 adjacent its lower end by a split ring 32. A helical coil compression spring 34 is arranged concentrically with the thrust member 16 with its lower end portion seating against the upwardly facing surface of the annular member 30 and with its upper end portion seating against the downwardly facing surface of piston member 12 for exerting an upward force on the piston member 12 to urge it toward the plug 10. Fluid pressure is supplied by a conduit 36 held by a conduit fitting 38 screw-threaded within the plug 10 as at 40. Fluid supplied by the conduit 36 enters the interior of the tubular member 7 intermediate plug 10 and piston member 14 and exerts a fluid force against the upper or head portion of the piston member 14 which forces the piston member 14 downwardly within the member 7 against the upward force exerted by the spring 34.

The plate member 28 adjustably positions a substantially cubical block 41 which carries the electrode 4 whereby the electrode 4 may be aligned as desired with the electrode 5. This member 28 is welded to the lower end of the thrust member 16 which extends beyond the lower end of the cylindrical member 7 and is eccentrically positioned with respect to the longitudinal axis of thrust member 16. A concentric, downwardly extending cylindrical portion 42 of member 28 is received within a cylindrical aperture 44 opening through the top surface 48 of the block 41. Adjustment of the electrode 4 is accomplished by rotating the member 28 while holding block 41 against rotation. This movement causes the member 28 to rotate about the longitudinal axis of the member 16. Due to the offset of this axis with respect to the axis of portion 42, the block 41 and electrode will have limited lateral movement. Subsequent to adjustment, the block 41 is held in fixed position relative to member 28 by a set screw 49. The cylindrical portion 42 adjacent the set screw 49 is undercut as at 50 so that any roughening or burring of the member 42 caused by the set screw 49 will be below the normal diameter of the member 42 and will not interfere with the insertion or removal of the block 41 from the member 28.

Block 41 has a bottom surface 51 and parallel side surfaces 52 and 56. An internally screw-threaded aperture 62 opens downwardly through the surface 51 and receives an externally threaded collar member 64 which carries the movable electrode 4. An internally screw-threaded aperture 68 opens outwardly through the surface 56 and is spaced slightly below the top surface 48 for receiving one end of lead cable 70 of the secondary circuit of the welding transformer 72. This lead cable 70 is preferably of the laminated type with the flat surfaces extending laterally of the axis of the member 16 and portion 42 whereby the cable 70 may be easily flexed in accordance with the longitudinal movement of the head 3, but will hold the block 41 against rotational movement. If the cable is of the circular type which flexes in all directions, then a slotted fiber strip 71 attached to the welding machine body at a convenient location could be used. If desired, both the flat laminated cable and strip 71 could be used.

As shown, the coolant for the electrode 4 flows within the cable 70 to a passageway 73 within the block 41 communicating with the hollow interior of electrode 4. A hollow coolant distributing member 74 is arranged concentrically of the threaded aperture 62 and has its upper end portion screw-threaded as at 76 into the bottom wall of the aperture 62 so that the hollow member 74 is in open communication with the passageway 73. The lower portion of the member 74 extends downwardly within the hollow portion of electrode 4 and terminates adjacent the end of the hollow portion thereof for carrying the coolant from the passageway 73 down into the electrode 4 for cooling thereof. The coolant thus supplied flows upwardly through the annulus formed between the hollow interior of the tip 4 and the outer surface of the tubular member 74 toward the bottom of the screw-threaded aperture 62 where it is conducted by means of a passageway 77 to an internally threaded aperture 78 which opens outwardly through the surface 56. The coolant return conduit 80 is suitably secured in the aperture 78 by a conduit attaching connection 82 and extends between the two guiding legs of the strip 71 whereby the block 41 is held against rotation. The other lead cable 84 of the secondary of the welding transformer 72 is connected to the electrode 5 which underlies the movable electrode 4 and upon which the work 88 to be welded is placed.

Energization of the welding transformer 72 is controlled by means of a suitable switch 90 located in the primary circuit 92 of the transformer 72. The electrode 5 and work 88 in usual welding practice are grounded to the body of the welding machine of which the member 1 is a part. In order to prevent short circuiting of the electrodes 4 and 5, it is necessary that there be some sort of insulation between the element carrying the movable electrode 4 and the member 1. Therefore, in accordance with the teachings of this invention, I have arranged that the members 14 and 30 be fabricated from suitable insulating material such as "Gatke," which is a material composed of resin-impregnated cloth or fabric much like the commercial "Micarta," both of which may be purchased on the open market.

As shown in Fig. 2, the diameter of the helical coil spring 34 is such that when it is at its extreme point of eccentricity with respect to the thrust member 16, the outer surface of the coils of the spring 34 will not engage the inner walls of the member 7. It may now be seen that the members 14 and 30 completely insulate the thrust member 16 and the attaching screw 20 from electrical contact with any of the metallic members 7, plug 10, etc., which are in electrical connection with or in communication with the body of the welding machine, the spring 34 being arranged so that no amount of eccentricity with respect to the thrust member 16 which it can assume is enough for the spring 34 to short-circuit the thrust member 16 to the walls of the member 7. Furthermore, both the piston member 14 and the annular member 30 are located within the tubular member 7 where it is practically impossible for any flash metal to deposit thereon and thereby short out the insulating material.

In Fig. 3 I have shown another arrangement of the diameter of the helical coil spring 34' in which arrangement the spring is of sufficiently large diameter so that when it is eccentrically positioned within the tubular member 7, its outer surface engages the inner wall of the member 7 before the inner surface of the spring 34 is in engagement with the thrust member 16. A number of schemes for insulating the members have been tried in the prior art, such as placing an insulating sleeve around the tubular member 7 where it passes through the member 1. However, due to the fact that when the machine is operated a certain amount of flash metal will be discharged from the pieces being welded, practice has proved that after a period of time this flash metal deposits on the insulating member and continued use of the machine will produce enough flash metal to short-circuit the insulating member. I have provided a novel arrangement of parts in which the insulating members are all located within a metal enclosure, so that any flash metal discharge by the weld cannot deposit on and bridge across the insulating members thereby to short-circuit the welding electrode in which the movable electrode may be easily adjusted with respect to the stationary electrode, and which is simple and economical of manufacture and trouble-free in operation.

What is desired to be secured by United States Letters Patent is as follows:

1. In an electric welding apparatus, a single unitary member provided with a single continuous cylindrical bore opening outwardly through one end wall thereof, a piston of electrically insulating material slidably positioned within said bore, a piston rod having one end portion directly secured to said piston and its other end extending outwardly of said bore through said end wall, and a single block of electrically insulating material secured within said bore and having a passage therethrough for slidably accommodating said rod.

2. In an electric welding apparatus, a single unitary member provided with a single continuous cylindrical bore opening outwardly through one end wall thereof, a piston of electrically insulating material slidably positioned within said bore, a piston rod having one end portion directly secured to said piston and its other end extending outwardly of said bore through said end wall, and a single block of electrically insulating material secured within said bore and having a passage therethrough for slidably accommodating said rod, said block being spaced inwardly in said bore from said end wall so that it is protected from receiving and accumulating flash metal from the welding operation whereby a bridging circuit will not be formed from said rod to said member.

FREDERICK H. JOHNSON.

REFERENCES CITED

The following references are of record in the file of this patent:

UNITED STATES PATENTS

| Number | Name | Date |
|---|---|---|
| 1,046,639 | Pierce | Dec. 10, 1912 |
| 2,063,257 | Martin | Dec. 8, 1936 |
| 2,086,784 | Taylor | July 13, 1937 |
| 2,293,338 | Harris | Aug. 18, 1942 |